US009488032B2

(12) United States Patent
Robichaux et al.

(10) Patent No.: US 9,488,032 B2
(45) Date of Patent: Nov. 8, 2016

(54) METHOD AND APPARATUS FOR RETAINING A VALVE TO A CEMENT HEAD

(71) Applicant: Blackhawk Specialty Tools, LLC, Houston, TX (US)

(72) Inventors: Ron D. Robichaux, Houma, LA (US); Bobby L. Brown, Houma, LA (US)

(73) Assignee: Blackhawk Specialty Tools, LLC, Houston, TX (US)

( * ) Notice: Subject to any disclaimer, the term of this patent is extended or adjusted under 35 U.S.C. 154(b) by 89 days.

(21) Appl. No.: 14/251,217

(22) Filed: Apr. 11, 2014

(65) Prior Publication Data
US 2014/0306069 A1    Oct. 16, 2014

Related U.S. Application Data

(60) Provisional application No. 61/811,435, filed on Apr. 12, 2013.

(51) Int. Cl.
| | |
|---|---|
| *E21B 33/16* | (2006.01) |
| *F16L 3/137* | (2006.01) |
| *F16L 3/00* | (2006.01) |
| *E21B 41/00* | (2006.01) |
| *F16M 13/02* | (2006.01) |

(52) U.S. Cl.
CPC .............. *E21B 33/16* (2013.01); *E21B 41/00* (2013.01); *E21B 41/0021* (2013.01); *F16L 3/00* (2013.01); *F16L 3/137* (2013.01); *F16M 13/02* (2013.01)

(58) Field of Classification Search
CPC ......... F16L 3/12; F16L 3/1218; F16L 3/137; F16M 13/02; E21B 33/16; E21B 41/0021

USPC ........ 248/693, 60, 104, 229.17, 230.8, 74.3, 248/228.8; 602/4; 224/150, 236, 655, 255
See application file for complete search history.

(56) References Cited

U.S. PATENT DOCUMENTS

| | | | | |
|---|---|---|---|---|
| 980,464 | A * | 1/1911 | Wermuth | 602/4 |
| 1,304,153 | A * | 5/1919 | Bugge | 602/4 |
| 4,071,022 | A * | 1/1978 | Ewers | 602/4 |
| 4,194,652 | A * | 3/1980 | Williamson et al. | 222/181.3 |
| 4,572,172 | A * | 2/1986 | Williams | 602/4 |
| 4,625,719 | A * | 12/1986 | Chambers | 602/4 |
| 4,718,623 | A * | 1/1988 | McClure | 248/102 |
| 4,986,266 | A * | 1/1991 | Lindemann | 602/4 |
| 5,007,605 | A * | 4/1991 | Horvath | 248/62 |
| 5,873,551 | A * | 2/1999 | Jones | 248/102 |
| 6,601,890 | B1 * | 8/2003 | Firth | 294/74 |
| 6,669,064 | B2 * | 12/2003 | Perricone | 224/148.6 |
| 7,213,791 | B2 * | 5/2007 | Morris et al. | 248/102 |
| 2004/0140407 | A1 * | 7/2004 | Morris et al. | 248/102 |
| 2006/0169729 | A1 * | 8/2006 | Reis | 224/154 |
| 2010/0121236 | A1 * | 5/2010 | Goumas | 602/4 |
| 2010/0224739 | A1 * | 9/2010 | Allen | 248/103 |

* cited by examiner

*Primary Examiner* — Michael Safavi
(74) *Attorney, Agent, or Firm* — Ted M. Anthony

(57) ABSTRACT

An apparatus for retaining and securing elevated objects such as cement valves. A harness member is wrapped around the outer surface of an elevated object, and adjustable straps are tightened to secure the harness member in place. An elongate sling member, attached the harness member, is securely attached to a cement head assembly or other nearby support structure. The apparatus provides positive retention should an elevated object become detached, thereby preventing the object from falling and injuring personnel or damaging property.

4 Claims, 2 Drawing Sheets

METHOD AND APPARATUS FOR RETAINING A VALVE TO A CEMENT HEAD

BACKGROUND OF THE INVENTION

1. Field of the Invention

The present invention pertains to an apparatus for retaining and securing elevated objects. More particularly, the present invention pertains to an apparatus for attaching elevated equipment including, without limitation, cement plug valves, to a nearby support structure.

2. Brief Description of the Prior Art

Existing hose retention systems include conventional whip-check and/or choker devices that are typically attached between hoses and other equipment. Such existing retention systems typically comprise cables, ropes or other lines that secure a hose or other conduit to a nearby tank or other object to which said hose or conduit is connected. Such conventional retention systems prevent said hose or conduit from dropping or detaching completely in the event said hose or conduit becomes damaged or inadvertently disconnected, such as when impacted by a foreign object. However, such conventional retention systems do not adequately retain elevated objects (particularly heavy objects), and do not prevent said elevated objects from falling and injuring personnel or damaging property.

Automated cement plug valves are relatively heavy objects that are frequently used during well cementing operations. Such cement valves, which are often installed at or near a lateral input port of a cement head and have cement hoses attached, can often be positioned great distances (sometimes 40 to 60 feet or more) above a rig floor. In such installations, a cement valve can be attached to an elevated cement head using a hammer union connection or other connection means, while attached cement hose(s) can be secured to said valve using a metal cable or other line (so-called "tugger lines").

During well cementing operations, objects are typically lifted within a rig derrick using hoists and/or other lifting means. Frequently, such lifted objects pass in close proximity to a cement head and/or elevated cement valve. As a result, there is frequently a risk that such a lifted object will inadvertently make physical contact with a plug valve, shearing it away from a main cement head assembly. Although a cable or other line may connect said cement valve to a cement head assembly, such conventional connection means do not provide adequate protection to fully secure such valve and prevent it from falling on personnel or equipment situated there below.

Thus there is a need for an efficient and cost effective means for adequately securing cement valves and other elevated equipment in place. Such retention means should be affordable, easy to install and remove, and unobtrusive to ongoing operations. Further, said retention means should protect personnel and property situated below or in proximity to elevated objects from risks posed from inadvertent detachment and dropping of said elevated objects.

SUMMARY OF THE INVENTION

The retention assembly of the present invention provides secondary retention or attachment means for objects or equipment situated at an elevated position including, without limitation, cementing plug valves. In a preferred embodiment, the retention assembly of the present invention comprises a harness and sling assembly constructed of nylon fabric or other cloth or synthetic material.

A pouch-like harness member wraps around and supports a valve or other elevated object, and can be quickly and efficiently secured/tightened around said valve or other object using straps having hook and loop (Velcro®) fasteners. At least one sling or other cable member connected to said harness member can be efficiently secured to an adjacent cement head in order to provide positive retention should said valve become knocked loose, sheared or otherwise detached. In such an event, the retention assembly of the present invention prevents said valve from falling and injuring personnel or damaging property situated there below.

The retention assembly of the present invention is inexpensive, easy to use, and is significantly more effective than conventional connection systems (including, without limitation, whip-checks, tugger lines and/or conventional choker devices).

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
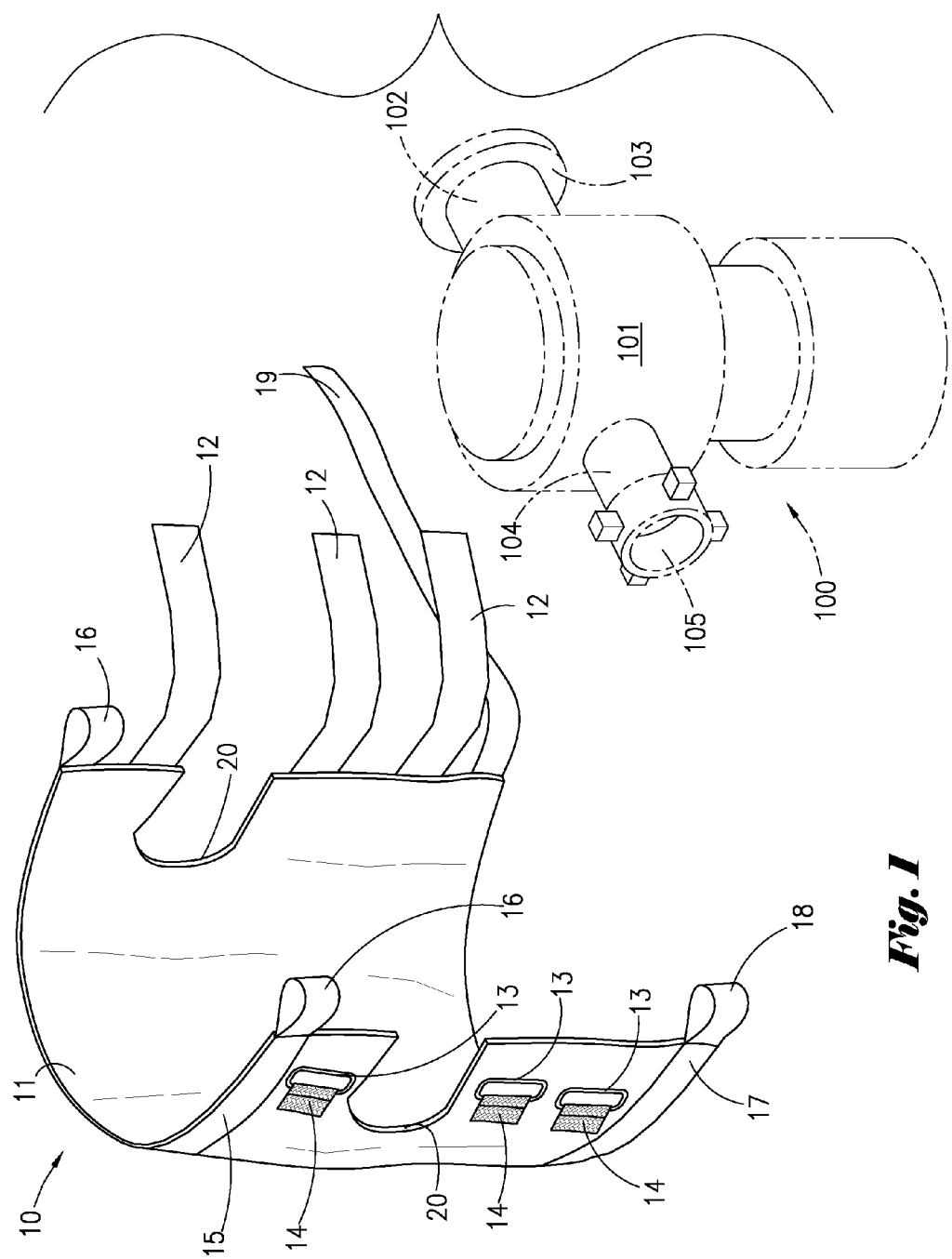
FIG. 1 depicts a side perspective view of the retention assembly of the present invention together with a conventional cement plug valve.

FIG. 1 depicts a side perspective view of retention assembly 10 of the present invention together with a conventional cement plug valve 100. By way of illustration, but not limitation, retention assembly 10 of the present invention is described herein as being used in connection with cement plug valve 100. However, it is to be observed that retention assembly 10 of the present invention can be used to retain and secure any number of other elevated objects or equipment other than said cement plug valve 100.

As depicted herein, said cement plug valve 100 comprises body section 101, as well as lateral conduit lines 102 and 104. Lateral conduit line 102 can be equipped with connection flange 103 for attaching valve 100 to an input port of a cement head (not depicted in FIG. 1). Lateral conduit line 104 can similarly be equipped with a hammer union connection 105 for attaching a cement hose, chicksan or other flow conduit to valve 100. It is to be observed that the specific configuration of cement plug valve 100 and associated components are depicted for illustration only, and may differ depending on a variety of factors including, without limitation, valve style and operational parameters. In many instances, valve 100 can weigh at least fifty (50) pounds or more.

Still referring to FIG. 1, retention assembly 10 of the present invention comprises harness member 11. Although other materials can be utilized without departing from the scope of the present invention, in a preferred embodiment said harness member 11 is constructed of nylon fabric or other cloth or synthetic material. Harness member 11 should be flexible, yet durable, rugged and resistant to ripping or tearing. Further, harness member 11 should have sufficient strength to support the weight of cement valve 100.

In a preferred embodiment, harness member 11 further comprises a plurality of straps 12 securely attached to said harness member 11, as well as a plurality of strap loops 13 securely attached to said harness member 11 using fabric bands 14. Although other attachment means can be utilized, said straps 12 and fabric bands 14 can be securely stitched to said harness member 11. Pairs of straps 12 and loops 13 can be beneficially aligned with each other along the vertical dimension of harness member 11. Although not visible in FIG. 1, said straps 12 can have hook and loop fasteners attached to each side at predetermined locations.

In a preferred embodiment, reinforcing strap 15 can be disposed along the upper edge of harness member 11, thereby defining a plurality of substantially aligned upper end loops 16. Similarly, lower reinforcing strap 17 can be disposed along the lower edge of harness member 11, thereby defining at least one lower end loop 18. Elongate sling member 19 extends from said harness member 11 and can be beneficially vertically aligned with lower end loop 18.

A vertical dimension of harness member 11 can be beneficially sized to match or substantially correspond to an object to be received within said harness member 11 such as, for example, cement valve 100. Further, at least one notch 20 can extend into harness member 11 and generally correspond to the location or placement of lateral conduit lines 102 and 104 of cement valve 100.

Figure 2:
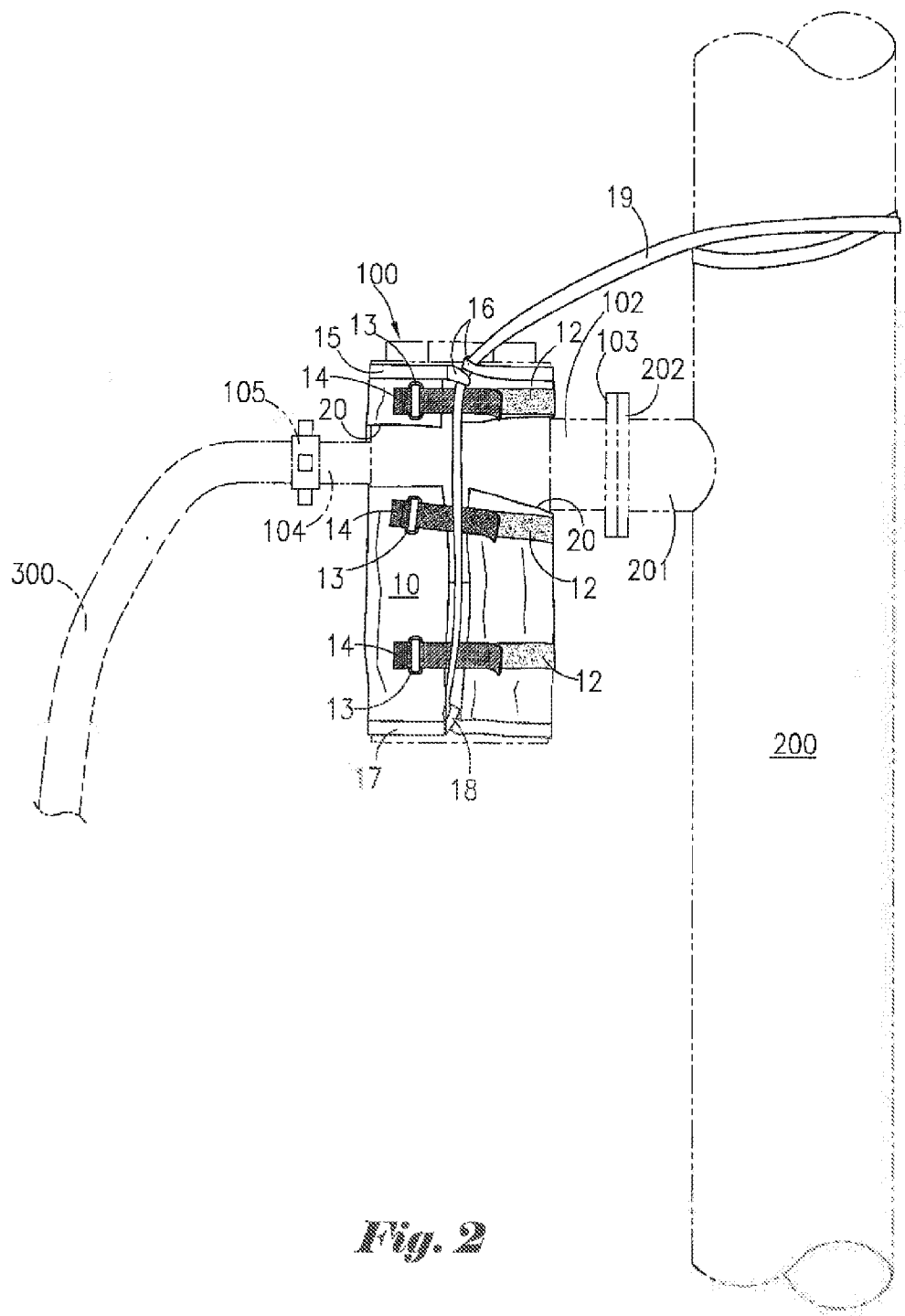
FIG. 2 depicts a side view of the retention assembly of the present invention securing a conventional cement plug valve during well cementing operations.

FIG. 2 depicts a side view of retention assembly 10 of the present invention securing a conventional cement plug valve 100 during well cementing operations. As depicted in FIG. 2, cement valve 100 is fluidly connected to a lateral input 201 of a cement head assembly 200, with flange 103 on conduit line 102 mating with flange 202 on input line 201. Cement hose 300 is attached to lateral conduit line 104 of valve 100 using hammer union 105. In the configuration depicted in FIG. 2, valve 100 can be positioned at an elevated location a substantial distance (sometimes 40 to 60 feet or more) above a rig floor.

As noted above, during well cementing operations, objects are frequently lifted within a rig derrick using hoists and/or other lifting means. Such lifted objects often pass in close proximity to cement head assembly 200 and/or elevated cement valve 100. As a result, there is frequently a risk that such a lifted object will inadvertently make physical contact with a valve 100, shearing it away from a main cement head assembly 200. Should such event occur, precautions should be taken to prevent valve 100 and associated equipment from falling on personnel or property situated there below.

Harness member 11 of retention assembly 10 is wrapped substantially around the outer surface of cement valve 100. In a preferred embodiment, the vertical dimension of said harness member 11 can be beneficially sized to match or substantially correspond to the vertical dimension of cement valve 100. At least one notch 20 generally corresponds to the location of lateral conduit lines 102 and 104 of cement valve 100.

A plurality of straps 12 are looped through corresponding and aligned strap loops 13, tightened and secured in place using hook and loop fasteners. As noted above, pairs of straps 12 and loops 13 can be beneficially aligned with each other along the vertical dimension of harness member 11. In this manner, harness member 11 can define an adjustable pouch or pocket for receiving valve 100, and can be tightened to fit snuggly and securely around the outer surface of said valve 100. Harness member 11 can be quickly, efficiently and ruggedly secured to valve 100.

Still referring to FIG. 2, in a preferred embodiment, reinforcing strap 15 is disposed along the upper edge of harness member 11, bringing aligned upper end loops 16 towards each other. Similarly, lower reinforcing strap 17 is disposed along the lower edge of harness member 11 and defines lower end loop 18. Elongate sling member 19 extends through aligned lower end loop 18, as well as aligned upper end loops 16.

Elongate sling member 19 is securely attached to cement head assembly 200 (alternatively, said sling 19 can be attached to another nearby support structure) to provide positive retention should valve 100 become knocked loose, sheared or otherwise detached from cement head assembly 200. In such an event, retention assembly 10 of the present invention prevents valve 100 from falling and injuring personnel or damaging property situated there below. Retention assembly 10 of the present invention is inexpensive, easy to use, and is significantly more effective than conventional connection systems (including, without limitation, whip-checks, tugger lines and/or conventional choker devices).

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A method for securing an elevated valve attached to a cement head against falling comprising:
  a) securing a harness assembly to said valve, wherein said harness assembly further comprises:
    (i) a sling defining a pocket, wherein said pocket is adapted to receive said valve;
    (ii) at least one strap attached to said sling; and
  b) connecting said at least one strap to a cement head to secure said valve to said cement head in the event of inadvertent detachment of said valve from said cement head.

2. The method of claim 1, wherein said harness assembly is constructed of fabric.

3. The method of claim 1, further comprising hooks or loops of a hook and loop fastener disposed on said at least one strap.

4. The method of claim 1, further comprising hooks or loops of a hook and loop fastener disposed on said harness assembly.

* * * * *